(12) United States Patent
Nagatomo et al.

(10) Patent No.: US 10,474,121 B2
(45) Date of Patent: Nov. 12, 2019

(54) CONTROL DEVICE AND EDITING DEVICE

(71) Applicant: Mitsubishi Electric Corporation, Chiyoda-ku (JP)

(72) Inventors: Yoshihiro Nagatomo, Aichi (JP); Daiki Kawakami, Aichi (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/776,570

(22) PCT Filed: Jan. 27, 2016

(86) PCT No.: PCT/JP2016/052389
§ 371 (c)(1),
(2) Date: May 16, 2018

(87) PCT Pub. No.: WO2017/130338
PCT Pub. Date: Aug. 3, 2017

(65) Prior Publication Data
US 2018/0341242 A1 Nov. 29, 2018

(51) Int. Cl.
*G05B 19/05* (2006.01)
(52) U.S. Cl.
CPC .... *G05B 19/058* (2013.01); *G05B 2219/1144* (2013.01)
(58) Field of Classification Search
CPC ......... G06F 8/71; G06F 11/3466; G06F 11/16
USPC ................................. 717/121, 127; 707/645
See application file for complete search history.

(56) References Cited

U.S. PATENT DOCUMENTS

| 4,802,116 | A | | 1/1989 | Ward et al. |
| 4,876,664 | A | * | 10/1989 | Bittorf ................. G05B 19/052 700/2 |
| 5,485,366 | A | | 1/1996 | Iwata |
| 5,485,620 | A | * | 1/1996 | Sadre ............... G05B 19/41865 700/18 |
| 5,777,874 | A | * | 7/1998 | Flood .................. G05B 19/058 700/82 |
| 7,546,323 | B1 | * | 6/2009 | Timmins ............. G06F 11/1464 |

(Continued)

FOREIGN PATENT DOCUMENTS

DE 37 51 713 T2 10/1996
DE 60 2004 007 209 T2 2/2008
(Continued)

OTHER PUBLICATIONS

Falcione et al., "Design Recovery for Relay Ladder Logic" (Year: 1993).*

(Continued)

*Primary Examiner* — Phillip H Nguyen
(74) *Attorney, Agent, or Firm* — Oblon, McClelland, Maier & Neustadt, L.L.P.

(57) ABSTRACT

A control device includes a storage unit that stores a program, a program execution unit that executes the program stored in the storage unit to control a device to be controlled, and a backup execution unit that stores, at the start of a backup operation of the program currently being executed, the program, information for identifying a location currently in execution in the program, information for identifying a location currently being held in the program, and operation data, in a backup storage unit.

5 Claims, 6 Drawing Sheets

(56) References Cited

U.S. PATENT DOCUMENTS

| | | | |
|---|---|---|---|
| 2001/0013102 A1* | 8/2001 | Tsuchiya | G06F 11/1464 714/4.5 |
| 2005/0071022 A1 | 3/2005 | Izzo et al. | |
| 2008/0126973 A1* | 5/2008 | Kline | G05B 19/056 715/772 |
| 2010/0262265 A1* | 10/2010 | Karaffa | G05B 19/056 700/87 |
| 2013/0006396 A1* | 1/2013 | Kito | G05B 19/4093 700/83 |
| 2018/0101159 A1* | 4/2018 | Nagatomo | G05B 19/054 |

FOREIGN PATENT DOCUMENTS

| | | |
|---|---|---|
| JP | 5-189016 A | 7/1993 |
| JP | 7-287660 A | 10/1995 |
| JP | 8-63205 A | 3/1996 |
| JP | 10-293619 A | 11/1998 |
| JP | 11-143505 A | 5/1999 |
| JP | 2003-330506 A | 11/2003 |

OTHER PUBLICATIONS

Office Action dated Mar. 15, 2019 in the corresponding German Patent Application No. 11 2016 006 057.2 with English Translation citing documents AO and AP therein 14 pages.

International Search Report dated Mar. 1, 2016 in PCT/JP2016/052389 filed Jan. 27, 2016.

Notification of Reasons for Refusal dated Aug. 15, 2016 in Japanese Patent Application No. 2016-542780 (with English language translation).

* cited by examiner

CONTROL DEVICE AND EDITING DEVICE

FIELD

The present invention relates to a control device that executes a program to control a device to be controlled, and to an editing device capable of editing a program.

BACKGROUND

A control device that executes a program to control a device to be controlled has conventionally been used. An example of such program is a sequential function chart program containing information on steps and transitions. A sequential function chart program is hereinafter referred to as "SFC program." An example of the control device is a programmable logic controller. A programmable logic controller is hereinafter referred to as "PLC." A PLC has been suggested that stores, in a storage table, step information relating to the step currently being executed among the information contained in an SFC program, and displays the step information on a display device to notify the step currently being executed in the SFC program (see, e.g., Patent Literature 1).

CITATION LIST

Patent Literature

Patent Literature 1: Japanese Patent Application Laid-open No. 5-189016

SUMMARY

Technical Problem

Execution of an SFC program requires information on steps and transitions. However, a conventional PLC only stores step information, and accordingly, if a backup operation is initiated during execution of an SFC program, a conventional PLC can only use the step information as of the time of start of the backup operation upon completion of the backup operation. Thus, when an SFC program currently being executed is to be backed up, a conventional PLC executes the SFC program from the beginning once again upon completion of the backup operation even if the SFC program has been executed halfway or more when the backup operation is initiated. A backup operation may be performed periodically at predetermined intervals, upon occurrence of an error in the PLC, or by a user instruction.

The present invention has been made in view of the foregoing, and it is an object of the present invention to provide a control device that, when a program currently being executed is to be backed up, enables the program to be executed from the step as of the time of start of the backup operation rather than from the beginning, after completion of the backup operation.

Solution to Problem

In order to solve the foregoing problem, and to achieve the object, the present invention includes a storage unit that stores a program, a program execution unit that executes the program stored in the storage unit to control a device to be controlled, and a backup execution unit. The backup operation unit stores, at a start of a backup operation of the program currently being executed, the program, information for identifying a location currently in execution in the program, information for identifying a location currently being held in the program, and operation data, in a backup storage unit.

Advantageous Effects of Invention

A control device according to the present invention is advantageous in that, when a program currently being executed is to be backed up, the program can be executed from the step as of the time of start of the backup operation rather than from the beginning, after completion of the backup operation.

DESCRIPTION OF EMBODIMENTS

A control device and an editing device according to embodiments of the present invention will be described below in detail on the basis of the drawings. Note that these embodiments are not intended to limit this invention.

First Embodiment

Figure 1:
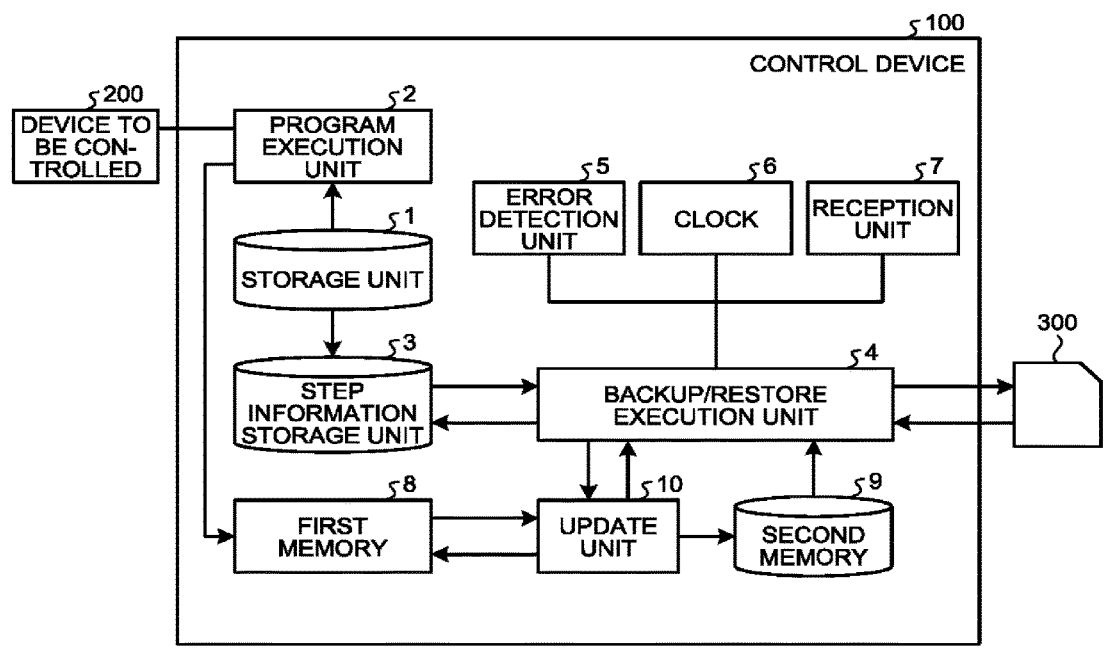
FIG. 1 is a configuration diagram of a control device according to a first embodiment.

FIG. 1 is a configuration diagram of a control device 100 according to a first embodiment. An example of the control device 100 is a PLC. The control device 100 executes a program containing information on steps and transitions to control a device 200 to be controlled. An example of the program is an SFC program.

Figure 2:
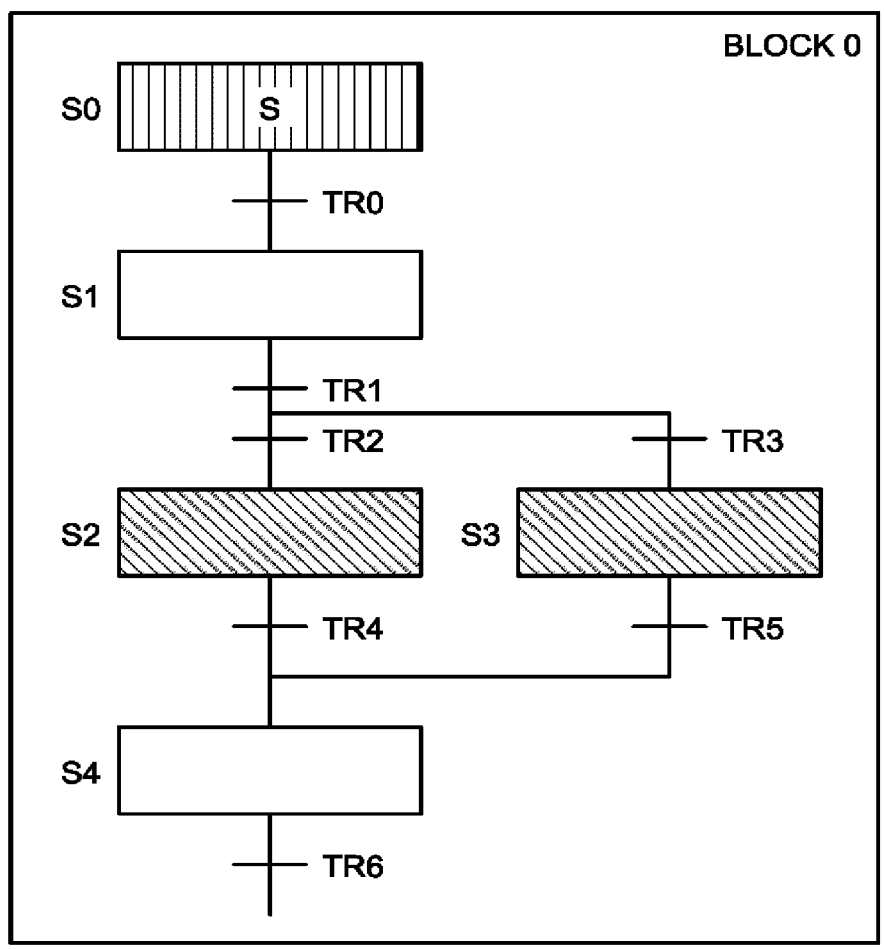
FIG. 2 is a diagram for explaining steps and transitions in block 0 in an SFC program of the first embodiment.
Figure 3:
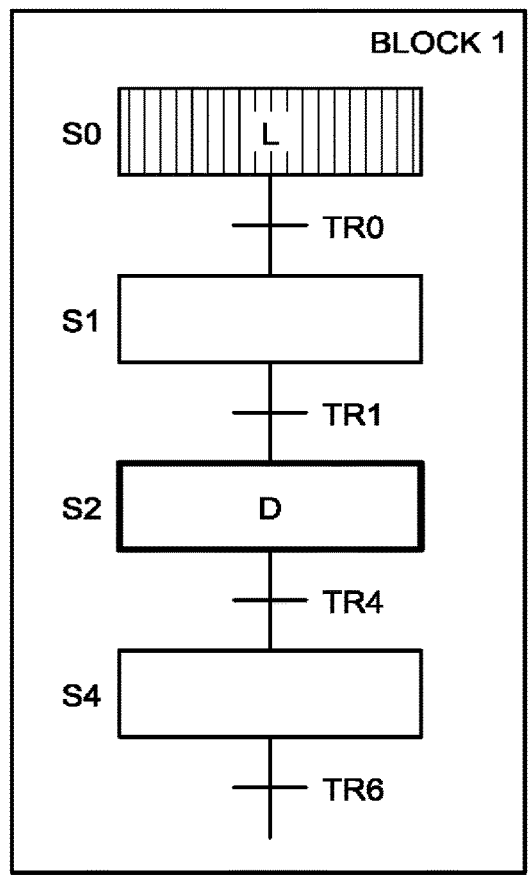
FIG. 3 is a diagram for explaining steps and transitions in block 1 in the SEC program of the first embodiment.
Figure 4:
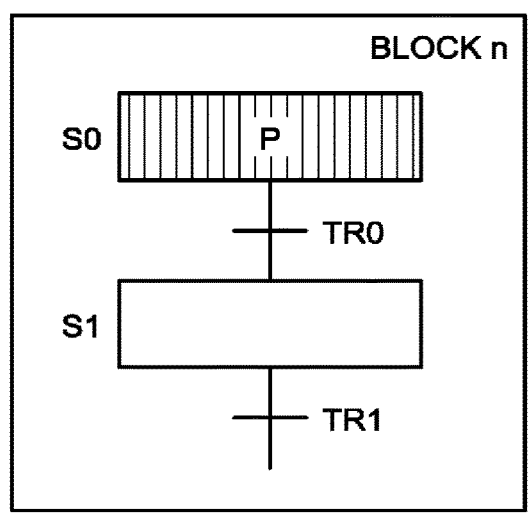
FIG. 4 is a diagram for explaining steps and transitions in block n in the SEC program of the first embodiment.

FIGS. 2, 3, and 4 are each a diagram for explaining steps and transitions of each block in an SFC program of the first embodiment. Specifically, FIG. 2 illustrates steps and transitions in block 0 among multiple blocks that constitute the SEC program at a certain moment; FIG. 3 illustrates steps and transitions in block 1 among the multiple blocks that constitute the SFC program at that moment; and FIG. 4 illustrates steps and transitions in block n among the multiple blocks that constitute the SFC program at that moment, where represents any integer of 2 or more.

In FIGS. 2, 3, and 4, symbols "S0," "S2," and "S3" indicate that the steps respectively corresponding thereto are active, while symbols "S1" and "S4" indicate that the steps respectively corresponding thereto are inactive. The term "active" denotes that an operation is being executed at that step, while the term "inactive" denotes that an operation is not being executed at that step. The SFC program contains information on a first state in which an operation is being executed at a step whose state has transitioned from "inactive" to "active," a second state in which an operation is continuously executed at a step even after completion of a transition, and a third state in which no operation is being executed. A step in the first state is a step currently being executed. A step in the second state is a step being held. A step in the third state is an inactive step.

In all of FIGS. 2, 3, and 4, the symbol "S0" indicates that the step corresponding thereto is in the second state, that is, being held; the symbols "S1" and "S4" indicate that the steps respectively corresponding thereto are in the third state, that is, inactive; and symbols "S2" and "S3" indicate that the steps respectively corresponding thereto are in the first state, that is, currently being executed. A symbol "S" indicates that the operation will be continuously executed even after completion of a transition. A symbol "L" indicates that the operation will be continuously executed even after completion of a transition, but the operation is terminated after elapse of a specific time period. A symbol "D" indicates that the step will be active after completion of a transition, but the operation is initiated after elapse of a specific time period. A symbol "P" indicates that the operation is executed only once, and the step will be inactive after completion of a transition.

As described above, each step in each of the multiple blocks that constitute an SFC program is one of a step currently being executed, a step being held, and an inactive step. FIGS. 2, 3, and 4 also each illustrate multiple transitions indicated by a combination of a symbol "TR" and a digit. Each of the multiple transitions is numbered using the digit described above.

As illustrated in FIG. 1, the control device 100 includes a storage unit 1 that stores a program containing information on steps and transitions, and a program execution unit 2 that executes the program stored in the storage unit 1 to control the device 200 to be controlled. As described above, an example of the program is an SFC program, and the SFC program is, for example, a program described using FIGS. 2, 3, and 4.

The control device 100 further includes a step information storage unit 3 that stores information on the step currently being executed in the program stored in the storage unit 1, and a backup/restore execution unit 4. The information on the step currently being executed described above includes information on the number and the type of the step currently being executed.

The backup/restore execution unit 4 has a function of a backup execution unit. The backup execution unit stores, at the start of a backup operation of the program currently being executed, information on steps and transitions contained in the program, executing step information for identifying the step currently being executed in the program, hold step information for identifying a step being held in the program, and operation data, in a backup storage unit 300. The executing step information includes information on the number of the step currently being executed in the program. The hold step information includes information on the number of the step being held in the program. The backup storage unit 300 is a component external to the control device 100. Information on a transition includes information on the number and the type of that transition. Operation data is temporary data obtained by an operation, or used in an operation, during execution of the program by the program execution unit 2.

Figure 5:
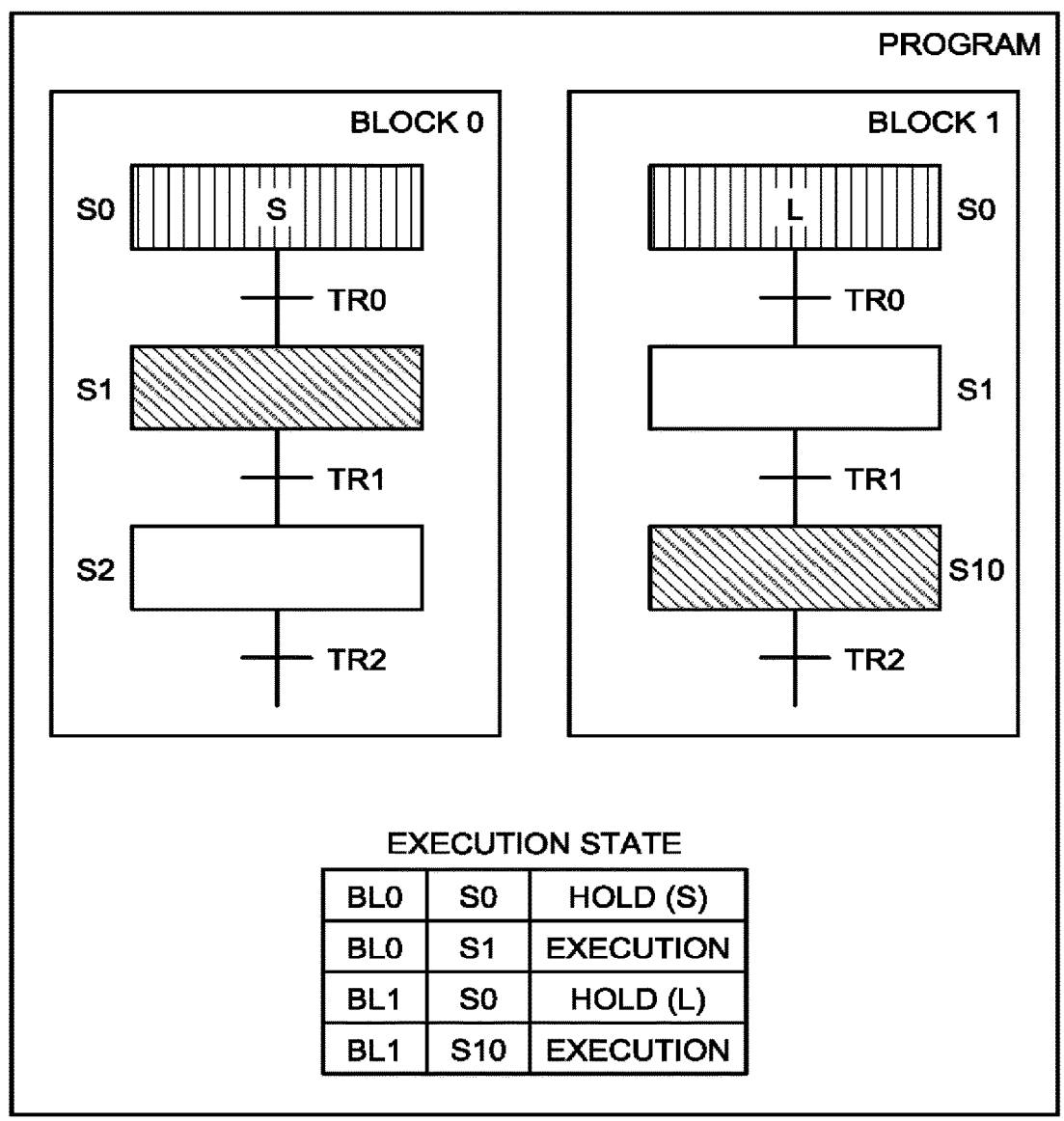
FIG. 5 is a diagram illustrating example states of the respective steps in two blocks contained in the program, as of the time of start of a backup operation of the first embodiment.

Using FIG. 5, the data stored in the backup storage unit 300 will now be described in detail. FIG. 5 is a diagram illustrating example states of the respective steps in two blocks, i.e., block 0 and block 1, contained in the program, as of the time of start of a backup operation of the first embodiment. In block 0 of FIG. 5, the symbol "S0" indicates that the step is being held; the symbol "S1" indicates that the step is currently being executed; and the symbol "S2" indicates that the step is inactive. In block 1 of FIG. 5, the symbol "S0" indicates that the step is being held; the symbol "S1" indicates that the step is inactive; and the symbol "S10" indicates that the step is currently being executed.

The example illustrated in FIG. 5 illustrates that, in block 0, the backup/restore execution unit 4 stores, in the backup storage unit 300, information indicating that the executing step number is S1, and that the hold step number is S0; and in block 1, the backup/restore execution unit 4 stores, in the backup storage unit 300, information indicating that the executing step number is S10, and that the hold step number is S0. In an execution state table in FIG. 5, the symbol "BL0" represents block 0, and the symbol "BL1" represents block 1.

The backup/restore execution unit 4 also has a function of a restore execution unit. A restore execution unit obtains, after completion of the backup operation of the program, information on steps and transitions contained in the program, executing step information, hold step information, and operation data from the backup storage unit 300, and then restores the execution state of the program as of the time of start of the backup operation based on the information obtained.

After completion of the backup operation of the program, the program execution unit 2 executes the program with the execution state of the program as of the time of start of the backup operation as restored by the backup/restore execution unit 4.

The control device 100 further includes an error detection unit 5 that detects an error if an error occurs in any portion inside the control device 100, a clock 6, and a reception unit 7 that receives a user instruction. The backup/restore execution unit 4 begins a backup operation of the program when the error detection unit detects an error, when the time of the clock 6 reaches a predefined time, or when the reception unit 7 receives an instruction to initiate a backup operation from the user.

The control device 100 further includes a first memory 8 that stores operation data, which is data obtained by an operation, or used in an operation, during execution of the program by the program execution unit 2. The first memory 8 has a function to store executing step information for identifying the step currently being executed in the program, and hold step information for identifying the step being held in the program. The executing step information includes information on the number of the step currently being executed in the program. The hold step information includes information on the number of the step being held in the program. The data held in the first memory 8 is temporary data.

The control device 100 further includes a second memory 9 that stores data to be stored, by the backup/restore execution unit 4, in the backup storage unit 300 at the start of a backup operation of the program. The control device 100 further includes an update unit 10 that writes the temporary data stored in the first memory 8 into the second memory 9 to update data stored in the second memory 9.

The backup/restore execution unit 4 uses the data stored in the second memory 9 to store, at the start of the backup operation of the program currently being executed, the information on steps and transitions contained in the program, the executing step information, the hold step information, and the operation data in the backup storage unit 300.

When the backup/restore execution unit 4 restores the execution state of the program as of the time of start of the backup operation after completion of the backup operation of the program, the following process is performed. That is, after completion of the backup operation of the program, the backup/restore execution unit 4 obtains, from the backup storage unit 300, the information on steps and transitions contained in the program, the executing step information, the hold step information, and the operation data.

A process of the backup/restore execution unit 4 restoring the execution state of the program as of the time of start of the backup operation will now be described using FIG. 5. As described above, the example illustrated in FIG. 5 illustrates that, in block 0, the backup/restore execution unit 4 stores information indicating that the executing step number is S1, and that the hold step number is S0 in the backup storage unit 300; and in block 1, the backup/restore execution unit 4 stores information indicating that the executing step number is S10, and that the hold step number is S0 in the backup storage unit 300, at the start of the backup operation.

After completion of the backup operation of the program, the backup/restore execution unit 4 obtains information indicating that the executing step number is S1, and that the hold step number is S0 from the backup storage unit 300 for block 0; and the backup/restore execution unit 4 obtains information indicating that the executing step number is S10, and that the hold step number is S0 from the backup storage unit 300 for block 1. By using the above information obtained from the backup storage unit 300, the information on steps and transitions contained in the program obtained from the backup storage unit 300, and the operation data obtained from the backup storage unit 300, the backup/restore execution unit 4 can restore the execution state of the program as of the time of start of the backup operation after completion of the backup operation.

An operation performed by the control device 100 after completion of the backup operation will further be described. The backup/restore execution unit 4 controls the update unit 10 to restore the execution state of the program as of the time of start of the backup operation, based on the information obtained. The update unit 10 obtains, from the backup/restore execution unit 4, the information obtained from the backup storage unit 300 by the backup/restore execution unit 4, and stores the information in the first memory 8. That is, data is stored in the first memory 8 that is for use in restoring the execution state of the program as of the time of start of the backup operation after completion of the backup operation of the program.

This operation enables the program execution unit 2 to use the data stored in the first memory 8 by the update unit 10, for use in restoring the execution state of the program as of the time of start of the backup operation after completion of the backup operation of the program. Thus, the program execution unit 2 can execute the program with the restored execution state of the program at the start of the backup operation, after completion of the backup operation of the program.

As described above, at the start of a backup operation of the program currently being executed, the control device 100 stores, in the backup storage unit 300, the information on steps and transitions contained in the program, the executing step information, the hold step information, and the operation data. After completion of the backup operation, the control device 100 obtains the information stored in the backup storage unit 300, and restores the execution state of the program as of the time of start of the backup operation.

The information obtained from the backup storage unit 300 includes not only the executing step information, but also the information on steps and transitions contained in the program, the hold step information, and the operation data. This enables the control device 100 to restore the execution state of the program as of the time of start of the backup operation after completion of the backup operation. That is, after completion of the backup operation, the control device 100 is able to execute the program from the step as of the time of start of the backup operation rather than from the beginning, based on the restored execution state of the program as of the time of start of the backup operation.

That is, the control device 100 enables the program to be executed from the step as of the time of start of the backup operation rather than from the beginning of the program, after completion of the backup operation even when, for example, an occurrence of problem has caused the error detection unit 5 to detect an error, and has caused a backup operation of the program currently being executed to be performed. Thus, the control device 100 can reduce the number of steps for executing the program after completion of the backup operation as compared to the number of steps that a conventional PLC would perform for executing the program. Besides, the control device 100 is able to reduce the time required to execute the program after completion of the backup operation as compared to the time required for a conventional PLC to execute the program.

Note that although the backup storage unit 300 is a component external to the control device 100 in the first embodiment described above, the backup storage unit 300 may be included inside the control device 100.

In addition, in the first embodiment described above, the backup/restore execution unit 4 of the control device 100 has both the function of a backup execution unit and the function of a restore execution unit. However, the backup/restore execution unit 4 of the control device 100 may have only the function of a backup execution unit, and may have no function of a restore execution unit. In such case, use of a control device including a component having the functions of the backup/restore execution unit 4 except for the function of the backup execution unit, and all the components of the control device 100 except for the backup/restore execution unit 4 enables the control device to restore the execution state of the program as of the time of start of the backup operation after completion of the backup operation, similarly to the control device 100. Thus, the program is able to be executed from the step as of the time of start of the backup operation rather than from the beginning, after completion of the backup operation.

A control device including a component having the functions of the backup/restore execution unit 4 except for the function of the backup execution unit, and all the components of the control device 100 except for the backup/restore execution unit 4 is hereinafter referred to as "modified control device." The modified control device is a device that includes all the components of the control device 100 except for the backup/restore execution unit 4, and includes a backup execution unit in place of the backup/restore execution unit 4. That is, the modified control device differs in configuration from the control device 100 only by the following difference, and therefore, the modified control device is not illustrated in the drawings. The modified control device differs in merely including the restore execution unit of the backup/restore execution unit 4 in place of the backup/restore execution unit 4 included in the control device 100.

Note that the first embodiment described above assumes that the program is an SEC program having concepts of "active," "inactive," and "held," but the program is not limited to an SFC program. It is sufficient that the program has concepts of a state representing an execution condition, a state representing a non-execution condition, and other state. The term "other state" described above corresponds to "held" in an SFC program. In short, it is sufficient that the backup/restore execution unit 4 stores information on the states representing "in execution," "not in execution," and "other state" associated with the program in the backup storage unit 300 at the backup operation. If the program is other than an SEC program, the backup/restore execution unit 4 stores, in the backup storage unit 300, the program, information for identifying a location currently in execution in the program, information for identifying a location currently being held in the program, and operation data, at the start of backup operation of the program currently being executed. This operation enables the program to be executed from the step as of the time of start of the backup operation rather than from the beginning, after completion of the backup operation.

Second Embodiment

Figure 6:
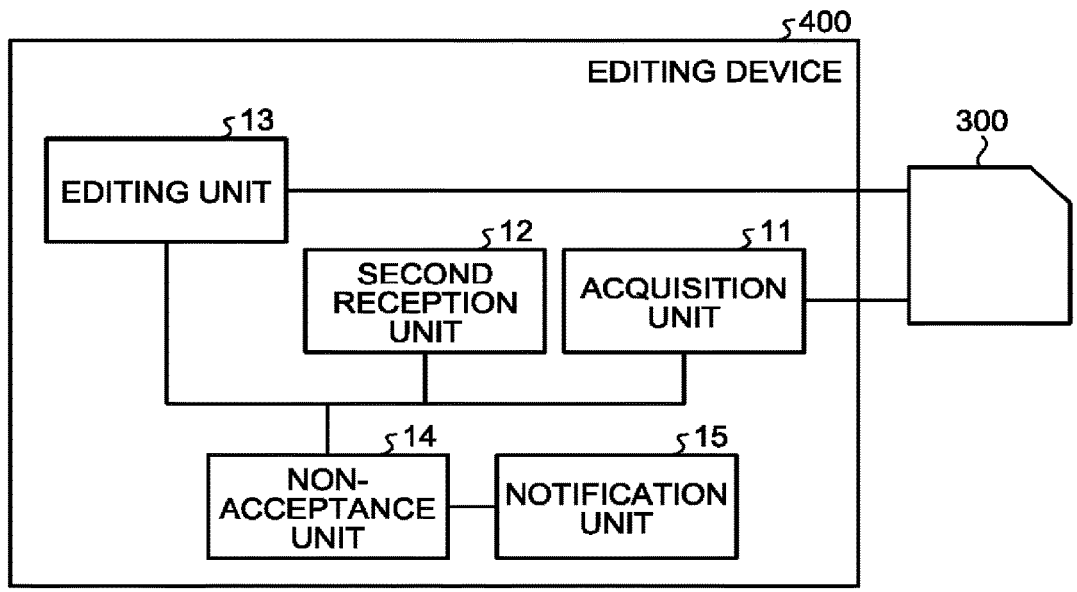
FIG. 6 is a configuration diagram of an editing device according to a second embodiment.

FIG. 6 is a configuration diagram of an editing device 400 according to a second embodiment. The editing device 400 is a device capable of editing the program of the first embodiment. The editing device 400 includes an acquisition unit 11 that obtains, from the backup storage unit 300 of the first embodiment, the information on steps and transitions contained in the program, the executing step information, the hold step information, and the operation data. The editing device 400 further includes a second reception unit 12 that receives an instruction to modify the program from the user, and an editing unit 13 that edits the program based on the instruction received by the second reception unit 12.

If the editing unit 13 edits the program, the editing unit 13 stores the program that has been edited in the backup storage unit 300, in which case the editing unit 13 stores the program that has been edited, thus replacing the program before the edition, in the backup storage unit 300. An example of modification of the program is addition of a new step to the program. An example of a step to be added is a step branched from an existing step. An example of process of the step to be added is prevention of recurrence of a problem that has occurred.

The editing device 400 further includes a non-acceptance unit 14 that determines not to allow edition of processes respectively corresponding to the executing step information and to the hold step information obtained by the acquisition unit 11. The editing device 400 further includes a notification unit 15 that if the non-acceptance unit 14 determines not to allow the edition of the processes described above, notifies the outside of the editing device 400 that the edition of the processes described above is not acceptable. An example of the notification unit 15 is a display device or a speaker that announces the non-acceptance of the edition of the processes described above using an image or sound.

In the editing device 400, the second reception unit 12 can receive an instruction to modify the processes respectively corresponding to the executing step information and to the hold step information obtained by the acquisition unit 11. However, the non-acceptance unit 14 determines not to allow the edition of the processes respectively corresponding to the executing step information and to the hold step information obtained by the acquisition unit 11. Thus, the editing unit 13 does not edit the processes respectively corresponding to the executing step information and to the hold step information obtained by the acquisition unit 11. Thus, the data stored in the backup storage unit 300 is maintained unchanged, thereby enabling the control device 100 according to the first embodiment to execute the program from the step as of the time of start of the backup operation after completion of the backup operation.

Figure 7:
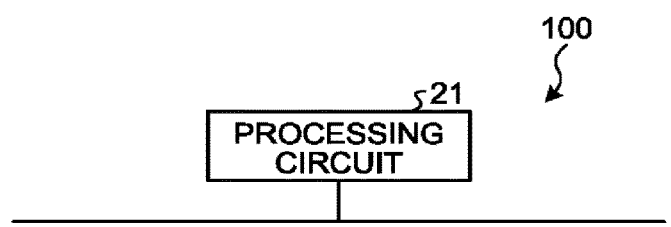
FIG. 7 is a diagram illustrating that at least some components included in the control device according to the first embodiment are implemented in a processing circuit.

Note that a part or all of the functions of multiple components including the program execution unit 2, the backup/restore execution unit 4, the error detection unit 5, the clock 6, the reception unit 7, and the update unit 10 included in the control device 100 according to the first embodiment may be implemented in a processing circuit 21. FIG. 7 is a diagram illustrating that at least some components included in the control device 100 according to the first embodiment are implemented in the processing circuit 21. The processing circuit 21 is dedicated hardware. That is, the processing circuit 21 is, for example, a single circuit, a set of multiple circuits, a programmed processor, a set of multiple programmed processors, an application specific integrated circuit (ASIC), a field-programmable gate array (FPGA), or a combination thereof. A part of multiple components including the program execution unit 2, the backup/restore execution unit 4, the error detection unit 5, the clock 6, the reception unit 7, and the update unit 10 included in the control device 100 may be implemented in dedicated hardware separately from the remainder.

Figure 8:
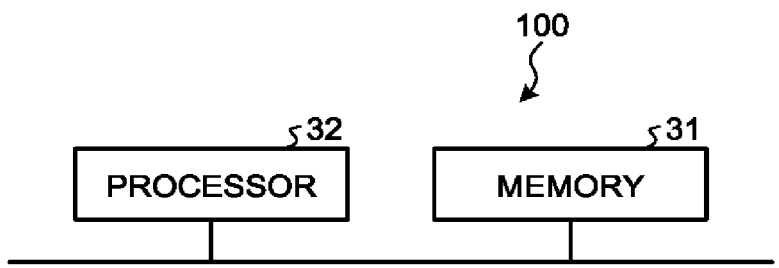
FIG. 8 is a diagram illustrating that at least some components included in the control device according to the first embodiment are implemented in a processor.

A part or all of the multiple components including the program execution unit 2, the backup/restore execution unit 4, the error detection unit 5, the clock 6, the reception unit 7, and the update unit 10 included in the control device 100 may be implemented in a processor 32 that executes a program stored in a memory 31. FIG. 8 is a diagram illustrating that at least some components included in the control device 100 according to the first embodiment are implemented in the processor 32. The processor 32 is a central processing unit (CPU), a processing unit, a computing unit, a microprocessor, a microcomputer, or a digital signal processor (DSP).

If at least a part of components included in the control device 100 are implemented in the processor 32, the functions of the part of the components included in the control device 100 are implemented in the processor 32, and software, firmware, or a combination of software and firmware. The software or firmware is described as a program, and is stored in the memory 31. The processor 32 reads and executes the program stored in the memory 31 to perform the functions f the part of the components included in the control device 100.

That is, if a part of the components included in the control device 100 are implemented in the processor 32, the control device 100 includes the memory 31 for storing the program that contains steps to be executed by that part of the components included in the control device 100. In other words, the program stored in the memory 31 causes a computer to execute a procedure or a method of that part of the components included in the control device 100. The memory 31 is, for example, a non-volatile or volatile semiconductor memory, such as a random access memory (RAM), a read-only memory (ROM), a flash memory, an erasable programmable read-only memory (EPROM), or an electrically erasable programmable read-only memory (EE- PROM); a magnetic disk; a flexible disk; an optical disk; a compact disc; a MiniDisc; a digital versatile disc (DVD); or the like.

The functions of multiple components included in the control device 100 may be implemented partially in dedicated hardware with the remainder implemented in software or firmware. Thus, the functions of multiple components included in the control device 100 can be implemented in hardware, software, firmware, or a combination thereof.

A part or all of the functions of the acquisition unit 11, the second reception unit 12, the editing unit 13, the non-acceptance unit 14, and the notification unit 15 included is the editing device 400 according to the second embodiment may be implemented in a processing circuit that is equivalent to the processing circuit 21 described above. A part of the acquisition unit 11, the second reception unit 12, the editing unit 13, the non-acceptance unit 14, and the notification unit 15 included in the editing device 400 may be implemented in dedicated hardware separately from the remainder.

A part or all of the acquisition unit 11, the second reception unit 12, the editing unit 13, the non-acceptance unit 14, and the notification unit 15 included in the editing device 400 may be implemented in a processor that executes a program stored in a memory that is equivalent to the memory 31 described above. The processor is one that is equivalent to the processor 32 described above.

If at least a part of components included in the editing device 400 are implemented in a processor, the functions of the at least the part of the components included in the editing device 400 are implemented in the processor, and software, firmware, or a combination of software and firmware. The software or firmware is described as a program, and is stored in the memory. The processor reads and executes the program stored in the memory to perform the functions of the part of the components included in the editing device 400.

That is, if a part of the components included in the editing device 400 are implemented in the processor, the editing device 400 includes the memory for storing the program that contains steps to be executed by that part of the components included in the editing device 400. In other words, the program stored in the memory causes a computer to execute a procedure or a method of that part of the components included in the editing device 400.

The functions of multiple components included in the editing device 400 may be implemented partially in dedicated hardware with the remainder implemented in software or firmware. Thus, the functions of multiple components included in the editing device 400 can be implemented in hardware, software, firmware, or a combination thereof.

The configurations described in the foregoing embodiments are merely examples of various aspects of the present invention. These configurations may be combined with a known other technology, and moreover, a part of such configurations may be omitted or modified without departing from the spirit of the present invention.

REFERENCE SIGNS LIST 100 control device; 1 storage unit; 2 program execution unit; step information storage unit; 4 backup/restore execution unit; 5 error detection unit; clock; 7 reception unit; 8 first memory; 9 second memory; 10 update unit; 200 device to be controlled; 300 backup storage unit; 400 editing device; 11 acquisition unit; 12 second reception unit; 13 editing unit; 14 non-acceptance unit; 15 notification unit.

The invention claimed is:

1. A control device comprising:
a memory configured to store a program containing information on steps and on transitions; and
processing circuitry configured to:
    control a to-be-controlled device by executing the program stored in the memory; and
    in response to a backup event, perform a backup operation for the program currently being executed, including storing backup information that includes (a) the program, (b) executing step information for identifying a step being executed in the program at a start of the backup operation, (c) hold step information for identifying a step being held in the program at the start of the backup operation, and (d) corresponding operation data in a backup storage.

2. The control device according to claim 1, wherein the processing circuitry is further configured to:
after completion of the backup operation, obtain the backup information, and
execute the program by restoring an execution state of the program as of a time of the start of the backup operation based on the obtained backup information.

3. An editing device comprising:
processing circuitry configured to:
    obtain, from the backup storage according to claim 1, the backup information that includes (a) the program, (b) the executing step information, (c) the hold step information, and (d) the corresponding operation data; and
    determine, according to the obtained backup information, not to allow edition of a portion of the program corresponding to the executed step identified in the executing step information and to the held step identified in the hold step information.

4. A control device comprising:
a memory configured to store a program containing information on steps and on transitions; and
processing circuitry configured to:
    control a to-be-controlled device by executing the program stored in the memory storage; and
    after completion of a backup operation performed by the control device for the program,
        obtain backup information stored as a result of the backup operation from a backup storage, the backup information including (a) the program, (b) executing step information for identifying a step being executed in the program at a start of the backup operation, (c) hold step information for identifying a step being held in the program at the start of the backup operation, and (d) corresponding operation data, and
        execute the program by restoring an execution state of the program as of a time of the start of the backup operation based on the obtained backup information.

5. The control device according to claim 1, wherein the backup event comprises:
an error being detected;
a time of a clock reaches a predetermined time; or
an instruction to initiate the backup operation is received.

* * * * *